(12) United States Patent
Armbruster (10) Patent No.: US 8,025,828 B2
(45) Date of Patent: Sep. 27, 2011

(54) INJECTION MOLDING DEVICE WITH A ROTATABLE CENTRAL PART

(75) Inventor: Rainer Armbruster, Wolfach (DE)

(73) Assignee: Foboha GmbH Formenbau (DE)

( * ) Notice: Subject to any disclaimer, the term of this patent is extended or adjusted under 35 U.S.C. 154(b) by 0 days.

(21) Appl. No.: 12/810,199

(22) PCT Filed: Dec. 23, 2008

(86) PCT No.: PCT/EP2008/068253
§ 371 (c)(1),
(2), (4) Date: Jul. 6, 2010

(87) PCT Pub. No.: WO2009/080827
PCT Pub. Date: Jul. 2, 2009

(65) Prior Publication Data
US 2010/0276841 A1    Nov. 4, 2010

(30) Foreign Application Priority Data

Dec. 24, 2007    (CH) .................................... 2033/07

(51) Int. Cl.
*B29C 45/04* (2006.01)
*B29C 45/66* (2006.01)

(52) U.S. Cl. ............... 264/255; 264/297.2; 264/328.8; 425/110; 425/572; 425/588

(58) Field of Classification Search ............ 264/310, 264/250, 255, 328.8, 297.2; 425/110, 572, 425/588
See application file for complete search history.

(56) References Cited

U.S. PATENT DOCUMENTS

| 3,754,068 | A | 8/1973 | Fattori |
| 4,427,359 | A * | 1/1984 | Fukuoka et al. .............. 425/525 |
| 4,444,711 | A | 4/1984 | Schad |
| 4,734,023 | A | 3/1988 | Nesch et al. |
| 5,037,597 | A | 8/1991 | McGinley et al. |
| 5,518,387 | A | 5/1996 | Di Simone |
| 5,744,082 | A | 4/1998 | Bak |
| 6,709,251 | B2 | 3/2004 | Payette et al. |
| 6,787,094 | B2 | 9/2004 | Collette et al. |
| 6,824,381 | B2 | 11/2004 | Wohlrab |
| 2006/0033238 | A1* | 2/2006 | Gram ........................... 264/320 |
| 2009/0065973 | A1 | 3/2009 | Jung et al. |

FOREIGN PATENT DOCUMENTS

| DE | 2215289 | 10/1973 |
| DE | 10 2006 016200 A1 | 10/2007 |
| EP | 0895848 | 2/1999 |
| EP | 1119449 | 8/2001 |
| EP | 1155802 | 11/2001 |

(Continued)

OTHER PUBLICATIONS

Machine Translation of WO 2004/103676.*

(Continued)

*Primary Examiner* — Jill Heitbrink
(74) *Attorney, Agent, or Firm* — Ostrolenk Faber LLP (57) ABSTRACT

The present disclosure relates to an injection molding device with a first mold half and a second mold half, arranged movably with respect to said first half, and a central mold half arranged between said first and second halves and rotatable about an axis of rotation. Arranged to the side of the central mold half is a further processing device.

12 Claims, 4 Drawing Sheets

FOREIGN PATENT DOCUMENTS

| | | |
|---|---|---|
| JP | 55095544 | 7/1980 |
| WO | WO 00/12284 A | 3/2000 |
| WO | WO 01/10624 | 2/2001 |
| WO | WO 02/04186 A | 1/2002 |
| WO | WO 02/28622 | 4/2002 |
| WO | WO 03/049917 | 6/2003 |
| WO | WO 2004/103676 A | 12/2004 |
| WO | WO 2005/077637 A | 8/2005 |

OTHER PUBLICATIONS

International Search Report dated Jul. 1, 2009, issued in corresponding international application No. PCT/EP2008/068253.

* cited by examiner

INJECTION MOLDING DEVICE WITH A ROTATABLE CENTRAL PART

CROSS REFERENCE TO RELATED APPLICATIONS

The present application is a 35 U.S.C. §371 National Phase conversion of PCT/EP2008/068253, filed Dec. 23, 2008, which claims benefit of Swiss Application No. 02033/07, filed Dec. 24, 2007, the disclosure of which is incorporated herein by reference. The PCT International Application was published in the German language.

BACKGROUND

1. Field of the Disclosure

The field of the present invention is the injection-molding of plasticized materials, in particular plastic.

2. Related Art

Injection molds for producing articles from a plurality of plastic components or parts are known in the art. In addition to solutions based on turntables arranged in a parting plane, molds with a rotating, cube-like central part are also known.

U.S. Pat. No. 4,734,023 from Klöckner Ferromatik Desma GmbH discloses an injection molding device with a central part arranged between two outer parts which can move relative to each other along spars of an injection molding machine. The rotatable central part is floatingly mounted on two separate guide rods arranged parallel to the spars of the injection molding machine. The guide rods protrude from one of the die platens of the injection molding machine. The arrangement allows only small central parts.

U.S. Pat. No. 4,444,711 from Husky Injection Molding Systems Ltd. discloses a device for producing brushes. A cube-shaped central part, which is rotated in 90° increments about an axis of rotation perpendicular to the spar, is arranged between two outer parts which are movable relative to each other along spars. The device allows brushes to be produced from a hard and a rubber-like soft plastic. The transfer of the parts from the first outer part to the second outer part via the cube-shaped central part is brought about by undercuts.

European patent EP 1155802 from the same applicant discloses an injection molding device with two production planes (parting planes) with a reversing system which is arranged between a stationary and a movable mold part and serves to mount a central mold part. The central mold part is held by a lower and an upper crossmember by means of holding means and arranged so as to be rotatable about a vertical axis. The crossmembers are guided on the spars of an injection molding machine. In order to compensate for the weight of the central mold part, the lower crossmember is, if necessary, supported on the machine bed of the injection molding machine. The holding means are arranged so as to be displaceable relative to one another in order to allow the central mold part to be exchanged. In a first production plane, a first material component is injected into a cavity, thus producing a first part. The part made of the first material component clings to the central mold part when the mold is opened, and is brought with the central mold part, by rotating the central mold part in one 180° or two 90° increments, into the second production plane, where it is operatively connected to a second material component after the mold has been closed. The central mold part is supported on the spars of an injection molding machine via holding devices.

EP 0895848, from Ferromatik Milacron Maschinenbau GmbH, discloses a further device with two parting planes. A central mold part, which is mounted in a lower and an upper crossmember and supported on a machine bed of an injection molding device, is arranged between a stationary and a movably arranged mold half. The central part is arranged so as to be rotatable about a vertical axis through 180° and has cavities only on two sides. The bearing in the region of the upper crossmembers can be opened so as to allow the central part to be removed.

EP 1119449 (referred to hereinafter as EP'449), from Krauss Maffei Kunststofftechnik GmbH, discloses an injection molding device with two production planes, with a stationary and a movable mold half. A mold central part, which is held on one side by means of a guide sunk in the machine bed of an injection molding machine and is arranged so as to be rotatable about an axis, is arranged between the two mold halves. The injection molding machine is for this purpose adapted so as to meet these particular requirements. The device described in EP'449 is suitable for producing parts from a plurality of plastic components.

U.S. Pat. No. 6,824,381B2 from Krauss Maffei discloses an injection molding device with a rotating central part. A central part, which is rotatable about a vertical axis, is arranged between two outer parts which are movable relative to each other along spars of an injection molding machine. The central part is arranged on a carriage supported on the machine bed of the injection molding device. The guide of the central part is not connected to the spar of the injection molding machine.

U.S. Pat. No. 6,709,251B2 from MGS Enterprises, Inc. discloses a further injection molding device with a rotatable central part, which device corresponds in terms of its construction largely to the aforementioned U.S. Pat. No. 6,824,381 B2.

WO03/049917 from Gram Technology APS describes in an unclear manner in the form of concept approaches and without specific solution proposals a type of injection molding device with a central part rotating about an axis of rotation. The inventor believes that the rotation should be utilized for closing hinge closures. Because the hinge closures are intended to be closed as the mold rotates, they cannot be arranged in any desired manner in the parting plane. For example, the open closures cannot be oriented parallel to the axis of rotation. Owing to the principles involved, this concept is highly limited.

U.S. Pat. No. 6,787,094B2 from Continental PET Technologies discloses an injection molding device for producing multilayered preforms for beverage packages. In this case too, a rotatable central part is arranged about a vertical axis between two outer parts which are movable relative to each other along spars. The central part is rotated in each case through 180°.

DE2215289 discloses an injection blow mold with a rotating central part which is arranged between a stationary first outer part and a second outer part, which is movable relative thereto, and serves to produce hollow bodies by injection blow molding. The outer parts surround the core formed by the central part.

JP55095544 from Japan Steel Works Ltd. discloses a device for assembly-type injection molding. An injection mold is arranged on an injection molding machine with two injection stations. A first mold outer part is arranged in a stationary manner and a second so as to be displaceable along four spars. Between the two mold outer parts, a mold central part is arranged so as to be rotatable about an axis and likewise displaceable along the spars of the injection molding machine. Secondary processing machines, which serve to process intermediate products held on the mold central part in a 90° position, are arranged at an angle of 90° relative to the longitudinal direction of the spars. The secondary processing machines are arranged in a stationary manner in relation to the injection molding machine, so that the secondary processing machines can be used only when the mold central part is stationary.

GB14807 from Mardon Illingworth discloses an injection molding device with a lid closing mechanism, integrated in a parting plane, for closures. The lid closing mechanism closes the closure in that the closure upper part is guided on a circular path toward the closure lower part.

U.S. Pat. No. 5,518,387 from Husky Injection Molding Systems Ltd. discloses a device for removing workpieces from an injection molding device. The injection molding device is based on swivel arms which are swiveled from the side into the parting plane about an axis of rotation arranged parallel to the parting plane when the injection molding device is opened.

U.S. Pat. No. 5,037,597 from Husky Injection Molding Systems Ltd. discloses a device for unloading and assembling injection molded parts from an injection mold. The parts are grasped and assembled from different parting planes by means of grippers.

U.S. Pat. No. 5,744,082 from Marland Mold Inc. discloses an injection mold with a lid closing mechanism, integrated in the region of the parting plane, for hinge closures. The lid closing mechanism is based substantially on a frame which is rotatable about an axis and acts on the closure upper part.

WO0228622 from Schoettli AG discloses a device for closing hinge closures in an injection mold with a large number of cavities. The device is pushed linearly from the side on a rail system in the region of the parting plane between the two mold halves when the injection mold is opened. The individual pushers are controlled by sliding blocks.

Drawbacks of the methods and devices known in the art include the fact that they do not allow precise positioning and thus efficient production of parts while including a third mold half. An efficient solution is possible only by an optimum interplay.

SUMMARY

An object of the invention is to disclose a device and a method by means of which more highly integrated or more complex parts in an injection molding device can be efficiently produced.

A further object of the invention is to disclose a device by means of which hinge closures with a plurality of material components can be produced and closed before removal, while further parts are produced in two further mold parting planes.

In one embodiment of the invention, an injection molding device (injection mold) according to the invention is operatively connected to an injection molding machine. The injection molding device has a first mold half and a second mold half arranged in relation to the first so as to be linearly movable in a first direction. A central mold half, which is rotatable about an axis of rotation, is arranged between the first and second mold halves. The at least one central mold half interacts with the first and a second mold half in the region of a first and a second parting plane. Cavities, which serve to shape plasticized material introduced therein, are provided in the region of the first and/or in the region of the second mold half. Typical reshaping processes are injection molding or blow molding of plastic or another plasticizable material. In a further embodiment, there are more than one central mold halves interacting with one another or the outer mold halves in a central parting plane.

The central mold half is typically the shape of a cube or cuboid and is mounted so as to be movable by means of a holding device in relation to the spars of the injection molding machine and/or on a machine bed of the injection molding machine. The holding device serves to move the central mold half along the spars and to rotate the central mold half about the axis of rotation. A linear drive and a coordination device, respectively, cause the central mold half to remain arranged at all times roughly centrally between the other mold halves neighboring it during opening and during closing of the mold halves. The central mold half is rotated in increments about the axis of rotation by means of a rotary drive, so that intermediate products clinging to the central mold half pass from the first parting plane into the second parting plane.

In one embodiment, a further, third mold half and/or a processing device is movably arranged laterally next to the injection molding device. The third mold half and/or processing device travels, at least in certain regions, along with the central mold half in the first direction (direction of the spars) and serves to process or handle parts or intermediate products which cling to the central mold half and were produced in the first and/or the second parting plane even if the central part is still moving. The joint traveling shortens the processing time and increases precision, as the components of the device which are temporarily interconnected to one another are always optimally oriented in relation to one another. Higher precision is achieved as a result of centering which can be in several stages if required. It is also possible for certain processing procedures to already take place during traveling in that, once the central part has come to a standstill after the rotation, an intervention is carried out even if the linear movement along the spars has not yet come to a standstill. The term "a multistage centering" refers to a rough centering by first centering means and a subsequent fine centering by the same or further centering means. Whereas during a rough centering primarily the movement sequences are adapted to one another at least in certain regions, in a fine centering the parts which are to be brought effectively into engagement with one another are precisely adapted.

In one embodiment, the central mold half is rotatably mounted on a holding device. The holding device has a lower and an upper crossmember which are mounted on the spars of the injection molding machine by means of linear bearings. If required, the holding device is additionally supported on the machine bed of the injection molding device. Rotary units attached to the crossmembers serve to receive the central mold half therebetween. The central mold half is rotatable about its axis of rotation by means of the rotary units. Media are preferably supplied coaxially by at least one of the rotary units of the central mold half. The fact that the crossmembers are displaceable relative to each other allows the central mold half to be easily inserted into the holding device and removed therefrom again. A stand or holding frame, to which a further processing device is fastened, is attached at least to one of the crossmembers. In the case of relatively heavy processing devices, the crossmembers can be joined together at least during operation in order to better distribute the forces over the holding frame receiving the load of the processing device. If required, the holding frame is supported on the machine bed or outside the injection molding device on an auxiliary construction provided for this purpose (for example a rail system screwed down to the ground). Opposing counterweights are possible. Supporting on the ground may not be sufficient in high-precision systems.

The further processing device may for example be a third mold half or a lid closing device by means of which hinge closures attached to the central mold half are closed. The further processing device is generally arranged on the holding frame so as to be movable in at least one direction, so that it can be oriented and positioned in relation to the central mold half in the radial and/or tangential direction and if required in its angle. If the further processing device is for example a third mold half, corresponding linking and anchoring mechanisms can be provided, by means of which the third mold half can be temporarily anchored to the central mold half in a force-transmitting manner during the processing step. If required, specific actuators which generate a sufficient closing force are provided. The linking and anchoring mechanisms, as well as the actuators are generally configured so as to travel along.

In a further embodiment, the processing device serves to introduce, insert or anchor further parts into one or more cavities and/or injection molding parts (intermediate products) which were produced in a preceding processing step. The further parts can be externally supplied via a handling system. It is also possible to use the processing device for test purposes.

A third mold half or a further processing device is typically linked as follows:
a) after the cuboid-shaped central mold half has reached its intended rotational position, the third mold half/processing device, which is fastened to the holding frame, is moved radially toward a side face of the central mold half;
b) if required, centering means are brought into engagement with one another or anchoring elements are anchored to one another in a force-transmitting manner in such a way that the third mold half/processing device is precisely positioned or anchored in a force-transmitting manner in relation to the side face;
c) if required, the parts or intermediate products located in the region of the side face are moved relative to the side face, for example in that they are released out of cavity halves;
d) the intended processing step is carried out by means of the third mold half or the processing device;
e) detaching the third mold half or the processing device while the central mold half is stationary or the injection molding device is opened. If required, the device can be configured in such a way that the third mold half or the processing device partially rotates therewith.

In a further embodiment, the central mold half is mounted on a carriage which is arranged for example between the lower spars of the injection molding machine and is movable on a rail system in the direction of the spars. If required, the rail system can also be arranged outside the spars. A rotary system, which serves to mount the central mold half and by means of which the central mold half is rotatable about an axis of rotation arranged substantially perpendicularly to the spars, is attached to the carriage. If required, the central mold half can be supported by means of a crossmember on the upper spars for absorbing the moments produced and/or for transferring media. A third mold half and/or a processing device are arranged laterally, roughly at the level of the central mold half. The third mold half and the processing device respectively move in conjunction with the central mold half, at least in certain regions, along the spars during the opening and closing of the injection molding device. This offers the advantage of allowing this time to be utilized. The third mold half and the processing device respectively are operatively connected to the carriage and/or, if present, the upper crossmember. In one embodiment, the third mold half and the processing device respectively are mounted on a holding frame which is attached to the lower carriage so as to stick out. If required, supporting in relation to the machine bed of the injection molding machine and/or a different substrate can be provided. However, in devices requiring particularly high precision, this may have an adverse effect.

In a further embodiment, a third mold half is arranged laterally next to an injection molding device in a lateral direction, so as to be movable perpendicularly to the spars. The injection molding device has a first stationary mold half and a second mold half which is movable along spars. At least one second mold half, which is rotatable about an axis, is attached between the first and the second mold half. The third mold half interacts with a rotatable central mold half when the injection molding device is closed in that the third mold half corresponds to the cavities of a free side of the central mold half. If required, anchoring means and/or centering means of the above-described type are present, by means of which the third mold half can be directly or indirectly operatively connected to the central mold half.

Lid closing devices incorporated into a parting plane of an injection mold are known in the art (cf. the prior art mentioned at the outset). This has the drawback that production is delayed by the closing of the lids. In addition, the lid closing device has a complex construction and has to be integrated into the injection mold. A further drawback consists in the fact that the injection mold has to be majorly modified, so that retrofitting is not possible. In addition, the production sequence is further delayed, as an additional cooling phase is generally required before the lid is closed. In order to allow a lid closing device to be used laterally on an injection molding device according to the invention, it has to display special kinematics so that the caps of the hinge closures can be efficiently closed. One problem is that the closing elements have to be positioned behind the caps before the caps can be closed. In one embodiment, a lid closing device according to the invention has a second base plate which is displaceable in the lateral direction, i.e. generally parallel to a side face of the central mold half and relative to a first base plate. The second base plate is mounted in relation to the first base plate by means of linear bearings and is displaceable in relation thereto by means of a linear drive. Closing shackles, which can rotate about a second axis of rotation, are arranged on the second base plate. The second base plate has recesses which are arranged in such a way as to allow closures sitting on cores in a first position of the base plate to protrude through the base plate. Bringing the second base plate into a second position by linear displacement in relation to the first base plate causes the closing shackles to be positioned behind the closures, so that the caps are closed by rotating the closing shackles about the second axes of rotation.

The described device can also be used in a similar manner for injection molding devices with a plurality of rotating central parts. The central parts can be arranged one after another or laterally next to one another. It is also possible for the central part to rotate about a horizontal or vertical axis.

BRIEF DESCRIPTION OF THE DRAWINGS

Exemplary embodiments of the invention will be described with reference to the following figures, in which.

DETAILED DESCRIPTION OF THE EMBODIMENTS

Figure 1:
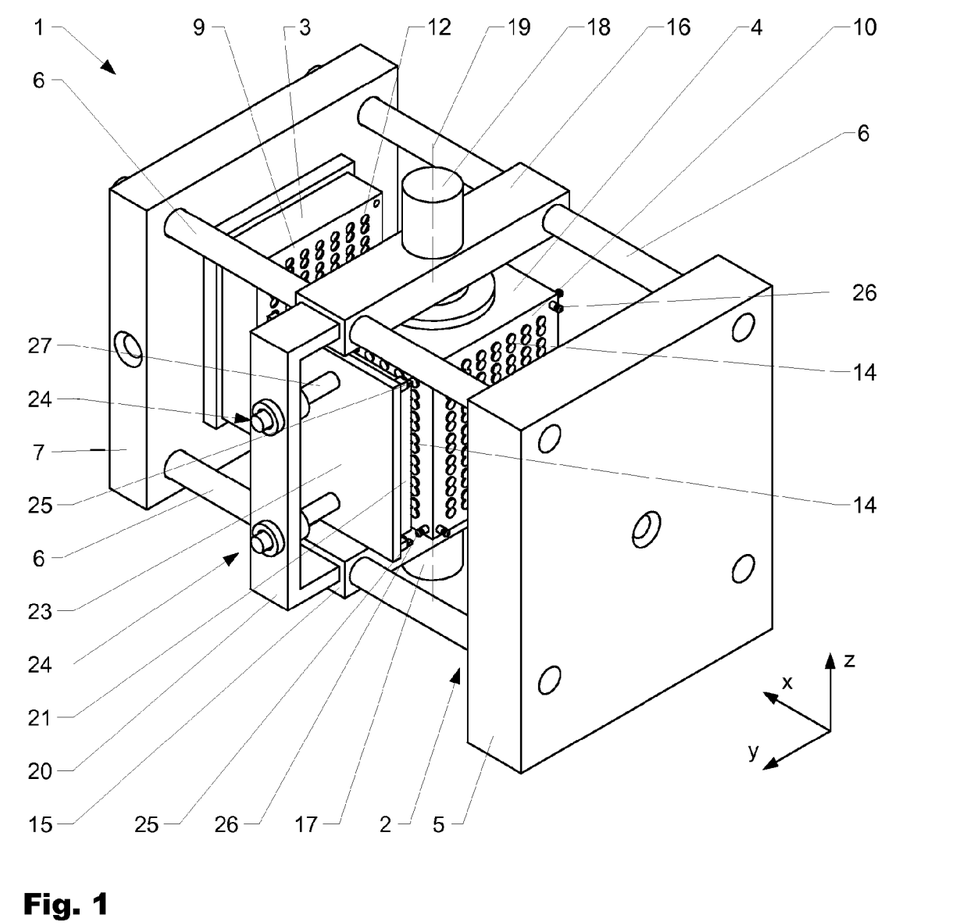
FIG. 1 shows a first embodiment of an injection molding device obliquely from above.
Figure 2:
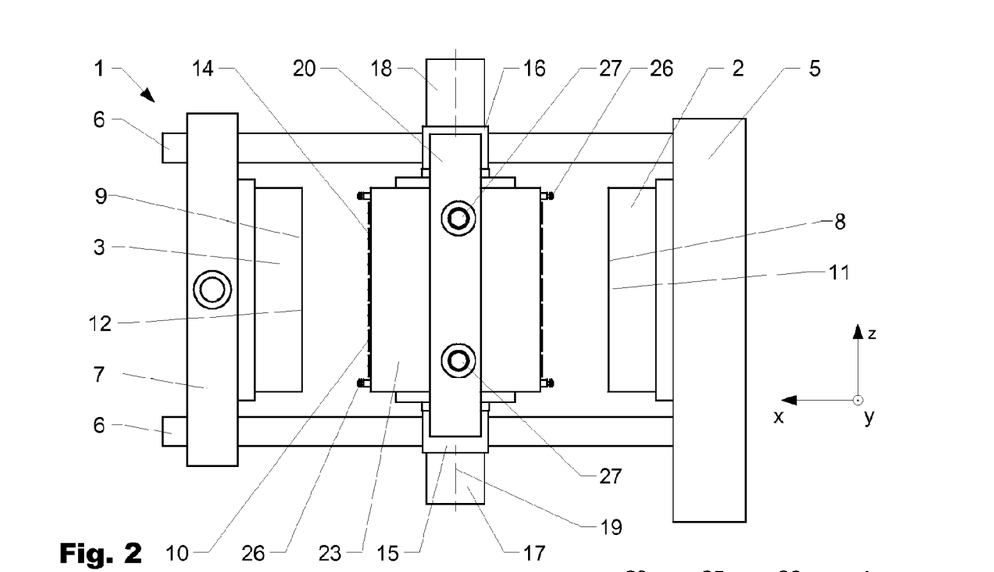
FIG. 2 shows the injection molding device according to FIG. 1 from the side.
Figure 3:
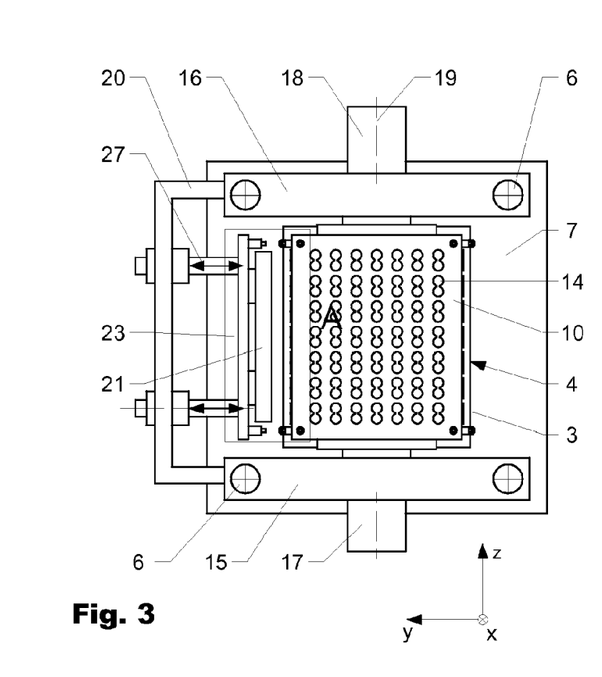
FIG. 3 shows the injection molding device according to FIG. 1 from the front.
Figure 4:
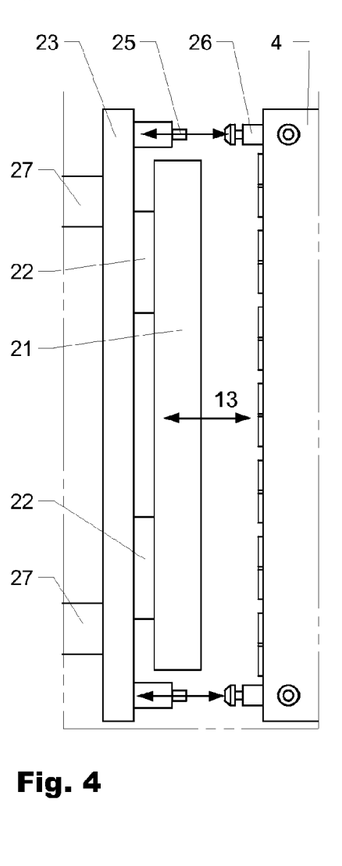
FIG. 4 shows detail A from FIG. 3.

FIG. 1 is a perspective view of an injection molding device 1 obliquely from above. The injection molding device is shown opened. FIG. 2 is a side view and FIG. 3 a front view of the injection molding device 1 according to FIG. 1. In FIG. 3 certain parts have been removed so that the interior is more clearly visible. FIG. 4 is an enlarged illustration of detail A from FIG. 3.

The injection molding device 1 has a first mold half 2 and a second mold half 3 which are attached to a first, in this case stationary, die platen 5 and a second die platen 7 which is linearly movable along spars 6. The first mold half 2 and the second mold half 3 have first and second cavity halves 11, 12 in the opposing side faces 8, 9. Normally, the die platens 5, 7 and the spars 6 form parts of an injection molding machine (not shown in greater detail). A central mold half 4, which is arranged so as to be rotatable about an axis of rotation 19, may be seen between the first and the second mold half 2, 3. In the embodiment shown, the central mold half 4 is configured in a cuboid-shaped manner and has in this case four side faces 10 which are each parallel in pairs and in which third cavity halves 14 are arranged. The side faces 10 and the third cavity halves 14 respectively interact, in a closed position of the injection molding device 1, with the corresponding first and second cavity halves 11, 12 in the opposing side faces 8, 9 of the first and the second mold half 2, 3 to form a plastic part.

In the embodiment shown, the central mold half 4 is mounted on a lower and an upper crossmember 15, 16 so as to be supported in relation to the spars 6 by means of linear bearings (not shown in greater detail). A lower rotary unit 17 and an upper rotary unit 18 allow the central mold half 4 to be endlessly rotated about the axis of rotation 19.

A holding frame 20, which in the embodiment shown serves to receive a third mold half 21, is attached laterally to the crossmembers 17, 18. Alternatively or additionally, other processing devices can also be provided. For example, an injection molding device can be equipped with a lid closing device to produce plastic closures. An example of a lid closing device according to the invention will be described in greater detail with reference to FIGS. 5 to 8.

In the embodiment shown, the holding frame 20 is operatively connected to the crossmembers 17, 18 and moves in conjunction therewith along the spars 6 during the opening and closing of the injection molding device. The third mold half 21 is operatively connected to a counterpressure plate 23 via actuators 22 (cf. FIG. 4). The counterpressure plate 23 and the third mold half 21 are displaceable in relation to the central mold half 4 in the lateral, radial direction (y direction, arrow 13, cf. FIG. 4) by means of a displacement unit 24 which is fastened to the holding frame 20 and has two telescopic rods 27 in the embodiment shown. Clamping pincers 25, which are engaged in the production position with anchoring elements 26 arranged in the region of the side faces 10 of the central mold half 4 and generate a form-fitting connection between the counterpressure plate 23 and the temporarily associated side face 10, are attached to the counterpressure plate 23. The third mold half is pressed against the temporarily associated side face 10 by means of a defined closing force by means of an actuator 22, for example in the form of a hydraulic cylinder, arranged between the counterpressure plate 23 and the third mold half 21. Plasticized material is subsequently injected into cavities, formed by the third and the central mold half, to form parts or components. Other forms of processing, such as hot embossing, printing, welding, in-mold labeling, are alternatively or additionally possible if required.

The operative connection, which is formed by the clamping pincers 25 and the anchoring elements 26 during a processing step, between the counterpressure plate 23 and the third mold half 21 saves the rotary units and the bearings thereof from excessive stress. In particular in the coaxial passing of media through the rotary units from and to the central mold half, a balanced distribution of forces is necessary in order to prevent leakiness. Alternatively or additionally, the forces can also be conducted to the opposite side of the rotatable central part through the crossmembers 15, 16. In this case, an actuator and a counterpressure plate, by means of which a compensating force can be exerted on the opposite side of the central mold half, are also provided on the opposite side. A fourth mold half, which allows a further material component or parts to be produced, can be provided on the opposite side if required.

In order to prevent uncontrolled distributions of forces, the displacement unit 24 is configured in such a way that it is able to compensate for load-induced deformations caused by the actuators 22 if required. This can be achieved by providing a resilient bearing arrangement or a compensating spring accumulator, for example. Further centering means, which protrude beyond the anchoring elements 26 and the clamping pincers 25 respectively and effect a centering of the elements to be brought into engagement of the central and the third mold half (or the processing device respectively) before the clamping pincers 25 are coupled to the anchoring elements, are provided if required.

Figure 5:
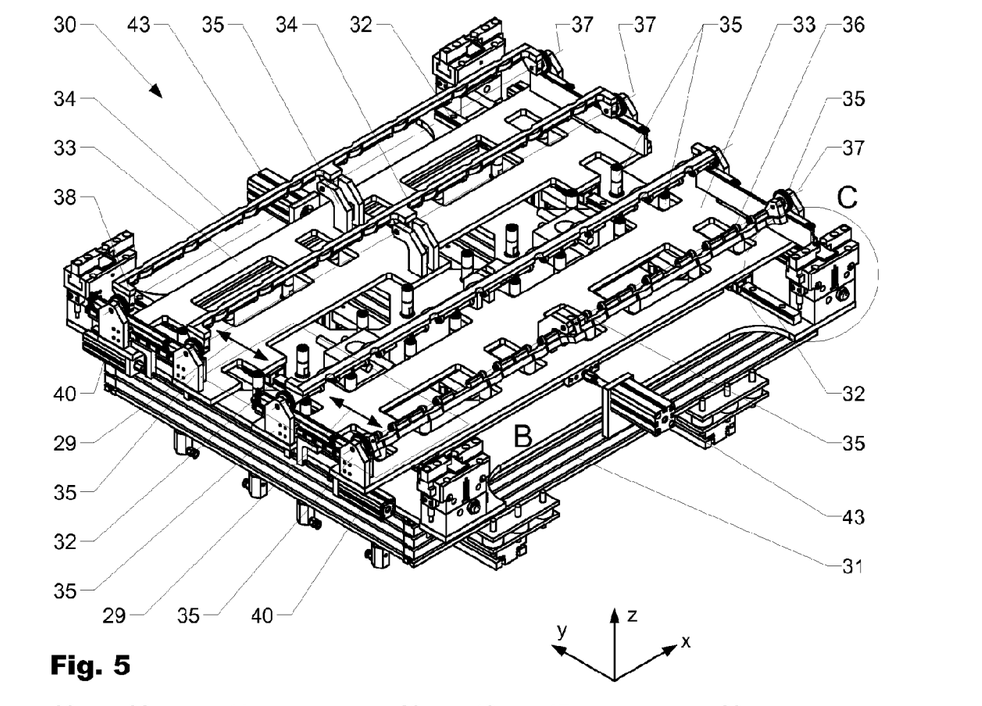
FIG. 5 is a perspective view of a lid closing device obliquely from above.
Figure 6:
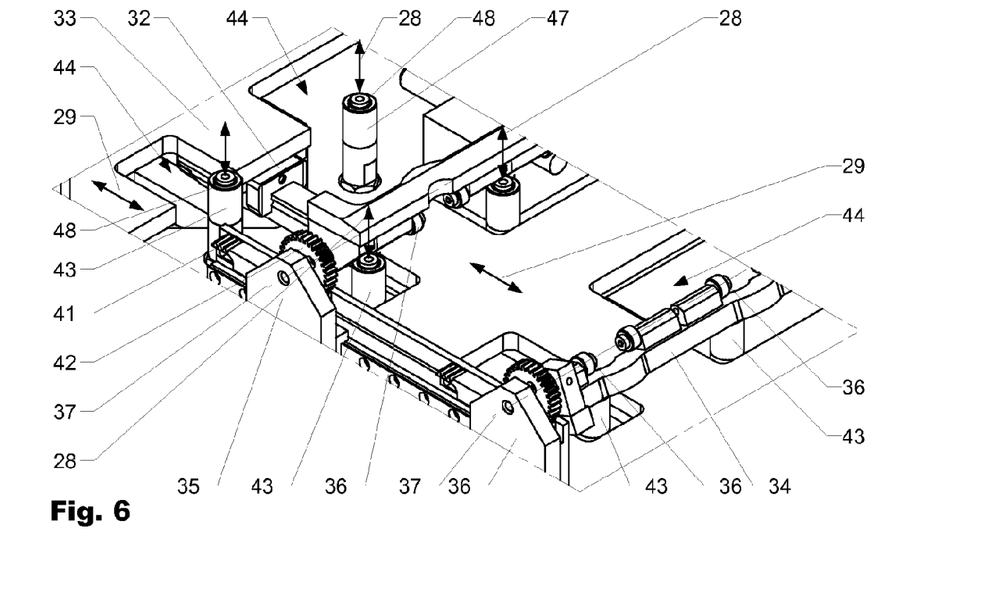
FIG. 6 shows detail B from FIG. 5.
Figure 7:
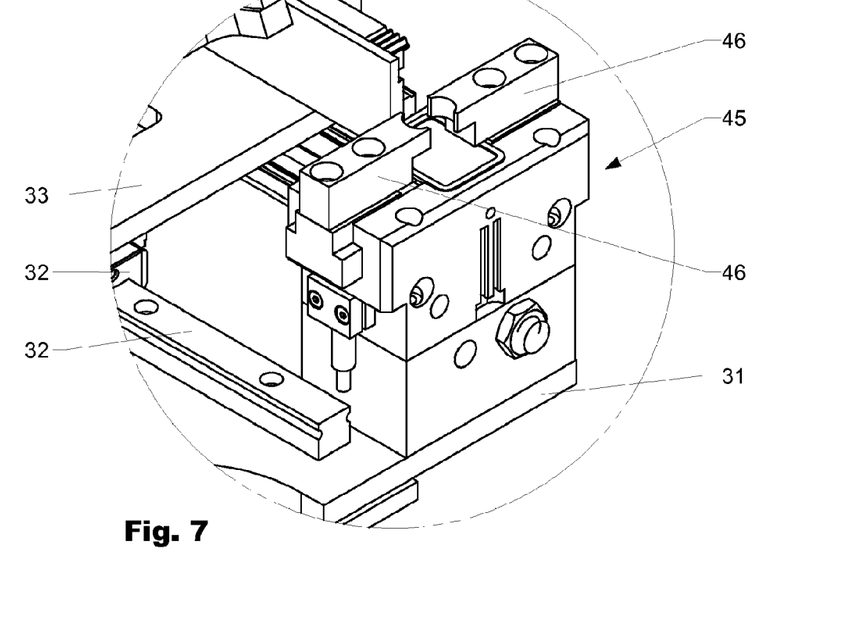
FIG. 7 shows detail C from FIG. 5.
Figure 8:
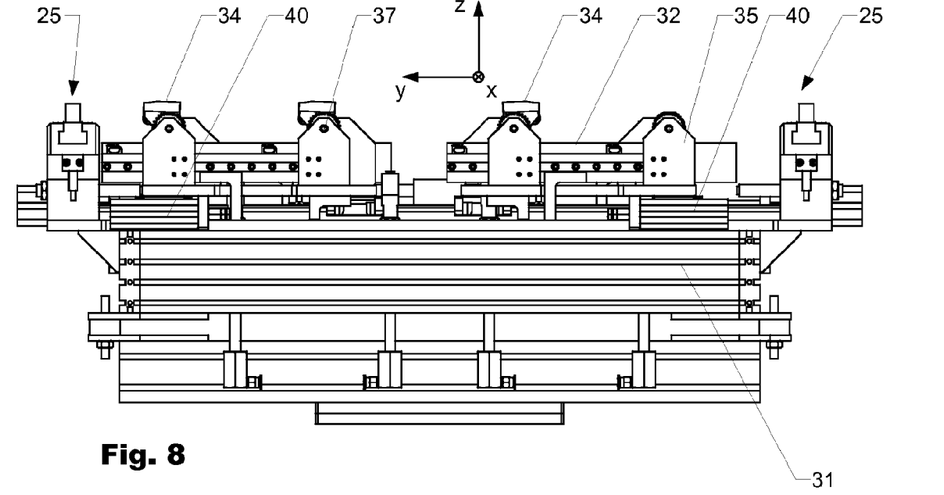
FIG. 8 shows the lid closing device from above.

FIG. 5 shows a lid closing device 30 according to the invention which is suitable for a use as an additional processing device in an injection molding device 1 according to FIGS. 1 to 4. FIG. 5 is a perspective view of the lid closing device 30 obliquely from above. FIG. 6 is an enlarged illustration of detail B from FIG. 5. FIG. 7 shows detail C from FIG. 5. FIG. 8 shows the lid closing device 30 from below, FIG. 9 shows it from the front and FIG. 10 shows it from above.

The embodiment shown of the lid closing device 30 has an, in this case frame-shaped, first base plate 31 on which two second base plates 33 are arranged. The second base plates 33 are linearly displaceable (cf. arrow 29) relative and parallel to the first base plate 31 in the local y direction by operatively connected linear drives 43, in this case in the form of pneumatic cylinders. The second base plates 33 serve, in turn, to mount and position, in this case four, closing shackles 34 which are rotatable about second axes of rotation 37 (parallel to the local x direction). The closing shackles 34 are each operatively connected to the second base plates 33 via three (two outer and one central) rotary bearing units 35. The closing shackles 34 are configured in a roughly E-shaped manner and have pressure rollers 36 in the region of their base (between the end legs). As may be seen, the closing shackles 34 are arranged eccentrically in relation to their second axes of rotation 37 by means of spacer means 38. The closing shackles 34 are driven by rotary drive means 39, consisting in this case of pneumatic cylinders 40, the pinions 42 coupled to the closing shackles 34 via toothed racks 41, so as to be rotatable about the second axis of rotation 37.

Pressure tappets 43, which are displaceable in the vertical direction (z direction, cf. arrow 28) and at the same time serve as suction grippers, are arranged on the first base plate 31. The second base plates 33 have recesses 44 so that they do not collide with the pressure tappets 43.

Clamping pincers 25, by means of which the lid closing device can be linked to corresponding anchoring elements 26 (cf. in this regard FIGS. 1 to 4) of a side face 10 of a rotatable central part (central mold half) 4, are arranged at four corners of the first base plate 31. FIG. 7 is an enlarged view of a clamping pincer 25. Two laterally displaceable tensioning jaws 46, by means of which a roughly mushroom-shaped anchoring element 26 (cf. FIGS. 1 to 4) can be temporarily surrounded in the region of the central mold half 4 in the production position, are arranged on a basic element 45 so as to stick out.

The following comments will be made with reference to FIGS. 1 to 8. It will be assumed in this case that, instead of the third mold half 21 shown in FIGS. 1 to 4, a lid closing device 30 according to FIGS. 5 to 8 is arranged on a holding frame 20. As soon as the lid closing element 30 has been brought into position in relation to a side face 10 of the central mold half 4 and operatively connected if required, the closing shackles 34 are pushed by means of the second base plates 33 under hinge closures (not shown), which consist of a closure upper part, a closure lower part and a hinge functionally connecting these parts and were released beforehand from the cavities of the side faces 10 by a function of the central mold half 4, and at least partly closed by means of the closing shackles by rotation thereof about the second axis of rotation 37. Subsequently, the pressure tappets, which are oriented onto the closure lower parts, are moved forward in a controlled manner, pressed around the closure upper parts against the closure lower parts which are in this way completely closed. At their leading end, the pressure tappets 43 have a suction cup 48 which is surrounded by a rigid sleeve 47 and by means of which the closed closures can be removed by the lid closing device. If required, the lid closing device can be arranged so as to be rotatable and displaceable about further axes so that the closures can be deposited in a controlled manner or flexibly transferred to a different conveying device. A vacuum device or tightness measuring device, by means of which the tightness of the closures can be checked during or before removal, can be integrated if required.

LIST OF REFERENCE NUMERALS

1 Injection molding device
2 First mold half
3 Second mold half
4 Central mold half
5 First die platen
6 Spars
7 Second die platen
8 First side face
9 Second side face
10 Side faces, central part
11 First cavity halves
12 Second cavity halves
13 Movement, third mold half (arrow)
14 Third cavity halves
15 Lower crossmember
16 Upper crossmember
17 Lower rotary unit
18 Upper rotary unit
19 Axis of rotation
20 Holding frame
21 Third mold half
22 Actuator
23 Counterpressure plate
24 Displacement unit
25 Clamping pincer
26 Anchoring element
27 Telescopic rods
28 Arrow, z direction
29 Arrow, y direction
30 Lid closing device
31 First base plate
32 Linear bearing
33 Second base plate
34 Closing shackle
35 Rotary bearing unit
36 Pressure rollers
37 Second axes of rotation
38 Spacer means
39 Rotary drive means
40 Pneumatic cylinder
41 Linear drive
42 Pinion
43 Pressure tappet
44 Recess
45 Basic element
46 Tensioning jaws
47 Sleeve
48 Suction cup

What is claimed is:
1. An injection molding device comprising:
a first mold half,
a second mold half slidable in relation to the first mold half in a first direction along spars,
at least one central mold half which is arranged between the first and the second mold halves and can rotate about an axis of rotation and is displaceable in the first direction,
a holding device movable in relation to the spars in the first direction, wherein the central mold half is rotatably mounted on the holding device, and
at least one further processing device which is arranged laterally of the injection molding device and at the level of the central mold half in the closed position of the injection molding device and is operatively connected to a temporarily associated side face of the central mold half,
wherein the holding device includes:
crossmembers mounted on the spars and configured and operable to mount the central mold half, and
a holding frame for holding the further processing device, and
rotary units attached to the crossmembers, the rotary units configured and operable to receive the central mold half therebetween.

2. The injection molding device as claimed in claim 1, wherein the further processing device is arranged on a movable holding device which moves in conjunction with the central mold half, at least in certain regions, during opening and closing of the injection molding device.

3. The injection molding device as claimed in claim 1, wherein the additional processing device is temporarily operatively connected in a production position via clamping pincers brought into engagement with corresponding anchoring elements.

4. The injection molding device as claimed in claim 3, wherein the anchoring elements are arranged in the region of the side faces of the central mold half.

5. The injection molding device as claimed in claim 1, wherein the crossmembers include a lower and an upper crossmember, and the holding frame for the further processing device is attached to the lower and/or the upper crossmember.

6. The injection molding device as claimed claim 1, wherein the further processing device has a counterpressure plate which is supported in relation to the central mold half by means of clamping pincers in a production position.

7. The injection molding device of claim 6, wherein the couterpressure plate is displaceable in relation to the central mold half by means of a displacement unit fastened to the holding frame.

8. The injection molding device as claimed in claim 1, wherein the additional processing device is a third mold half or a lid closing device.

9. The injection molding device of claim 1, wherein the further processing device is movable relative to the central mold half in at least one of a radial or tangential direction.

10. The injection molding device of claim 1, wherein the holding device includes a carriage movable on a rail system in the direction of the spars, and wherein the central mold half is mounted on the holding frame which is attached to the carriage to extend out.

11. A method for linking a processing device to an injection molding device with a first mold half and a second mold half which is movable in relation to the first mold half on spars, and at least one central mold half arranged between the first and the second mold half so as to be rotatable about an axis according to claim 1, comprising the steps of:
   a. moving the processing device radially toward an exposed side face of the central mold half and coupled thereto after the central mold half has reached an intended rotational position;
   b. bringing centering means into engagement with one another and/or anchoring anchoring elements to one another in a force-transmitting manner in such a way that the third processing device is precisely positioned and/or anchored in a force-transmitting manner in relation to the side face when required;
   c. releasing the parts or intermediate products located in the region of the side face of the central mold half relative to the side face when required;
   d. carrying out a processing step by means of the processing device;
   e. uncoupling the processing device from the central mold half while the central mold half is stationary or the injection molding device is opened.

12. The method as claimed in patent claim 11, wherein the processing device travels along during the coupling.

* * * * *